Patented May 8, 1928.

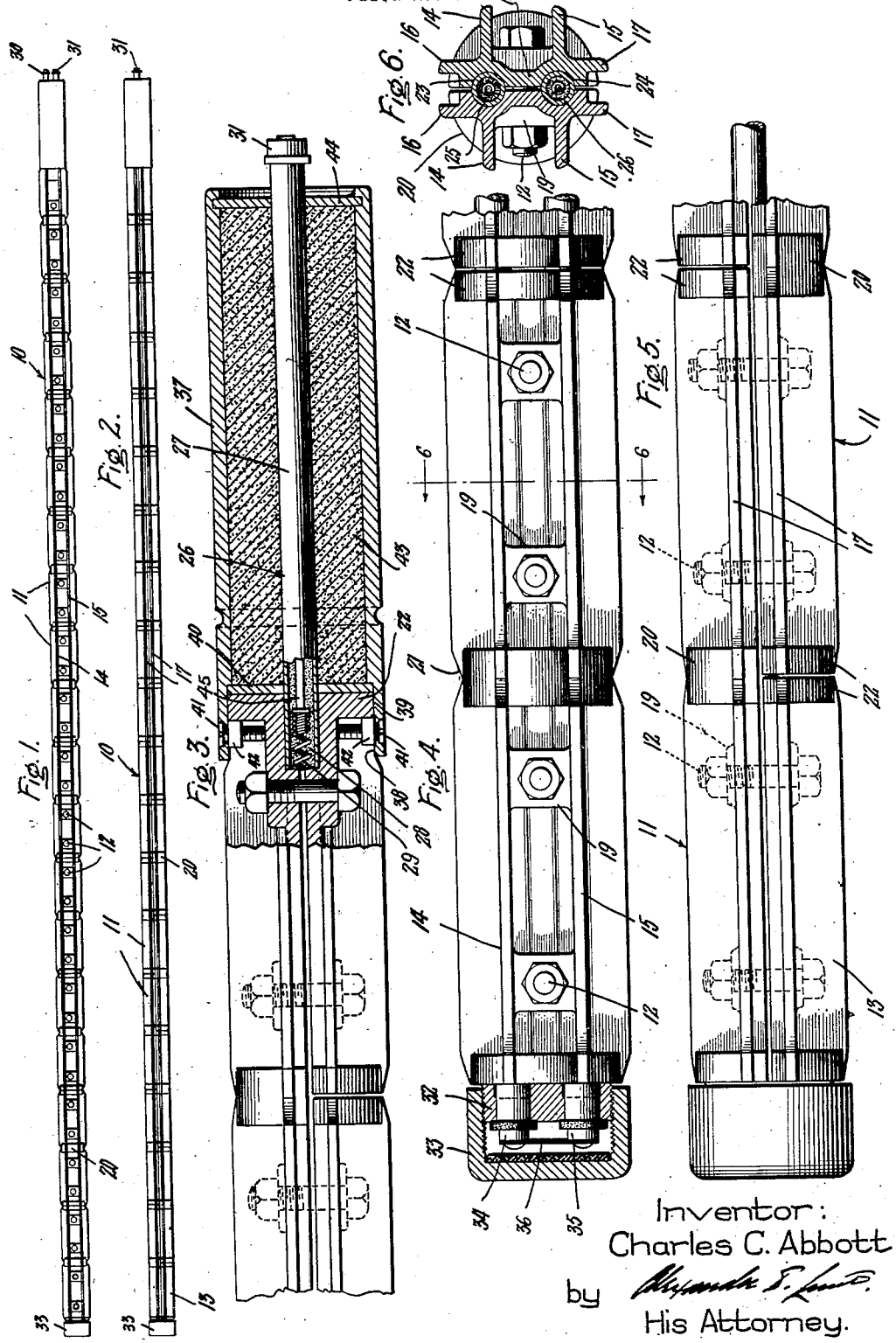

1,669,114

UNITED STATES PATENT OFFICE.

CHARLES C. ABBOTT, OF PITTSFIELD, MASSACHUSETTS, ASSIGNOR TO GENERAL ELECTRIC COMPANY, A CORPORATION OF NEW YORK.

ELECTRIC HEATER.

Application filed March 19, 1927. Serial No. 176,656.

My invention relates to electric heaters, more particularly to electric heaters for ovens and the like, and has for its object the provision of a simple, reliable and inexpensive device of this character.

In carrying out my invention, I provide an elongated supporting structure made up of a plurality of relatively short clamping members secured together in staggered relation, and between which are clamped lengths of a sheathed electric heating unit.

For a more complete understanding of my invention reference should be had to the accompanying drawing in which Fig. 1 is a plan view of an electric heater embodying my invention; Fig. 2 is a side elevation view of the device shown in Fig. 1; while Figs. 3, 4, 5 and 6 are enlarged fragmentary views showing details of construction; Fig. 6 being a sectional view taken along the line 6—6 of Fig. 4 looking in the direction of the arrows.

Referring to the drawing, my invention in one form comprises an elongated metallic support 10 which is built up from a plurality of metallic clamping members 11. These clamping members are relatively short as compared with the length of the support, and as shown in Fig. 5 they are secured together in staggered relation by means of bolts 12. In other words, there are two series of members 11 placed in end to end relation and clamped together by the bolts 12. The abutting ends of the members in one series, however, are situated adjacent the centers of the members in the other series so that a rigid elongated support of any desired length is thus formed. Half length members 13 are provided at each end of one of the series in order to make its length equal to the length of the other series which is made up entirely of full length members.

The clamping members 11 are made of any suitable metal having good heat conductivity, such as iron, and are preferably cast in the desired form. Each member is formed with a flat surface, the members being assembled with these flat surfaces together as shown in Fig. 6. The general contour of the outer or exposed portions of the members is semi-circular in cross-section so that the two members clamped together have a general circular configuration, as indicated in Fig. 6. Each member is provided on its outer surface with longitudinal ribs 14 and 15 perpendicular to its flat surface, and also with ribs 16 and 17 adjacent its edges. These ribs conduct and radiate heat away from the central portions. The metal connecting the ribs i. e. the main portion of the member is, in effect, a plate 18. Lugs 19 are formed between the ribs 14 and 15 at intervals to provide seats for the clamping bolts 12 passing through apertures therein. As shown, each member is secured by four bolts.

In order to increase the strength of the members at the central point where the ends of the members in the other series abut each other, each member is provided with a lateral semi-circular strengthening rib 20 at the center. As shown, this rib has a somewhat lesser height than the longitudinal ribs which are beveled at their ends downward to meet the transverse rib, as indicated by the numeral 21. At each end the members are provided with a transverse rib 22 which is similar to the central rib 20 but of only one-half its length longitudinally of the members.

Each clamping member is provided with substantially semi-circular grooves 23 and 24 which are adapted to receive sheathed electric heating units 25 and 26, these units, it will be understood, being clamped between the members. The resistance units are preferably of the type described and claimed in Patent No. 1,364,341 to Abbott, dated February 1, 1921, and briefly comprise an outer metallic sheath 27 in which a helical resistance conductor 29 is embedded in powdered heat refractory insulating material 28, such as magnesium oxide compacted to a hard dense mass. These units are provided with suitable terminals 30 and 31 respectively at one end of the heater. The opposite ends of the units extend through holes in a circular spacing member 32 and are brazed to the member 32 to form a tight joint. The member 32 is threaded to receive a cap 33 enclosing and sealing the ends of the units. The terminals 34 and 35 of the units at this end of the heater are electrically connected inside the cap by means of a conductor 36. The electrical connections with the heater are thus made solely with the terminals 30 and 31, the resistance conductors in the two units being connected in series.

At the terminal end of the heater a length of metallic pipe 37 is provided around the projecting ends of the heating units, the outer diameter of this pipe being somewhat greater than the diameter of the cylinder defined by the edges of the longitudinal ribs 14–17 inclusive. The ribs 14–17 inclusive are cut back a short distance at the end to the same diameter as the transverse ribs 22, as indicated by the reference numeral 38, and the end of the pipe, which is counterbored at 39, is slipped over the end of the unit, as indicated in Fig. 3. An end plate 40 is provided at the ends of the clamping members, the shoulder formed by the counterbore in the pipe being seated on this end plate. Holes are provided in the end plate for the heating units 25 and 26 which extend through the pipe 37 and project therefrom. The pipe 37 is secured on the clamping members by means of bolts 41 at spaced intervals around its periphery. These bolts are inserted from the outside through countersunk holes in the pipe and screwed into nuts 42 on the inside of the pipe. As indicated in Fig. 3, these nuts are drawn outward against the inner side of the pipe and thereby secured firmly in engagement with the side of the lateral rib 22. This secures the pipe 37 in place. The pipe is filled with suitable powdered insulating material 43, such as magnesium oxide, and closed at the end by a plate 44, the outer end of the pipe being counterbored to receive the plate and spun over to secure the plate in place.

Preferably, the joints between the inner plate 40, the pipe 37 and the heating units are sealed by a suitable cement to form a steam-tight joint, and the outer plate 44 is soldered to the pipe 37 and the heating units. These heaters are particularly adapted for use in baking ovens and the like. A convenient method of mounting them is to provide apertures in the wall of the oven at the top of the heating chamber through which the heaters may be inserted. For example, short lengths of pipe may be set in the apertures in the oven wall at the desired points of location of the heaters and the heaters may then be pushed through these pipes into the oven. In the interior of the oven, supports are provided at intervals along the lengths of the heaters. The circular outline formed by the longitudinal and transverse ribs facilitates this assembly since the units can be readily pushed through the wall openings. The pipe 37 at the end of each heater will lie in the wall opening which may be suitably sealed around the pipe. Preferably a terminal pin 45 extends through the end portion of each sheath lying in the pipe 37, it being connected to the helical resistance conductor substantially at the junction of the pipe 37 and the clamping members. With this arrangement practically no heat is generated in the pipe 37 and consequently it may be operated at a lower temperature than would be possible if the resistance conductor extended throughout the sheath.

While I have described my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention the scope of which is set forth in the annexed claims.

What I claim as new and desire to secure by Letters Patent of the United States, is:—

1. An electric heater comprising an elongated metallic sheath, a plurality of relatively short metallic members clamped in staggered relation on opposite sides of said sheath, and a resistance conductor in said sheath in insulated relation therewith.

2. An electric heater comprising an elongated metallic sheath, a plurality of relatively short metallic heat radiating members clamped in staggered relation on said sheath, a resistance conductor in said sheath in insulated relation therewith, and longitudinal heat radiating ribs on said members.

3. An elongated self supporting electric heater comprising a metallic sheath, oppositely disposed relatively short metallic members clamped on said sheath in staggered relation so as to form an elongated support, a resistance conductor in said sheath, powdered insulating material in said sheath compacted around said resistance conductor, and heat radiating ribs on said members.

4. An electric heater comprising a plurality of elongated metallic sheaths, a plurality of relatively short heat radiating members clamped in staggered relation on opposite sides of said sheath, said members being provided with semi-circular recesses fitting on said sheaths, and a resistance conductor in said sheath in insulated relation therewith.

5. An electric heater comprising a plurality of elongated metallic sheaths, a plurality of relatively short heat radiating members clamped in staggered relation on said sheath, resistance conductors in said sheath in insulated relation therewith, terminals for said resistance conductors projecting from said sheaths, an electrical conductor connecting the terminals at two adjacent ends of said sheath, and a cap member enclosing said conductor and the adjacent ends of said sheaths.

In witness whereof, I have hereunto set my hand this 17th day of March, 1927.

CHARLES C. ABBOTT.